No. 892,311. PATENTED JUNE 30, 1908.
O. SCHELLER.
APPARATUS FOR PLOTTING RESONANCE CURVES.
APPLICATION FILED MAR. 9, 1908.
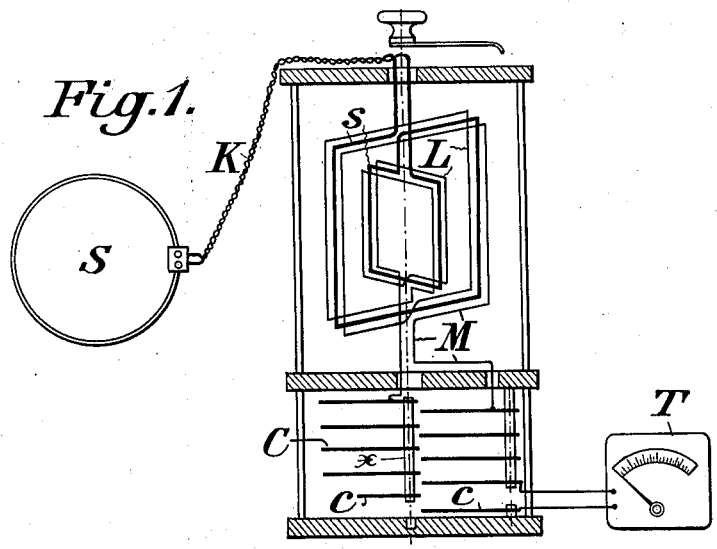
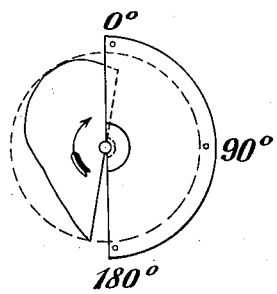
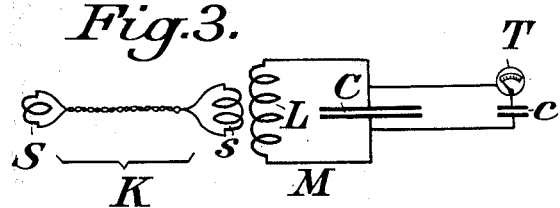
WITNESSES
INVENTOR
Otto Scheller
ATTORNEYS

UNITED STATES PATENT OFFICE.

OTTO SCHELLER, OF STEGLITZ, NEAR BERLIN, GERMANY.

APPARATUS FOR PLOTTING RESONANCE CURVES.

No. 892,311.　　　　　Specification of Letters Patent.　　Patented June 30, 1908.

Application filed March 9, 1908. Serial No. 419,961.

*To all whom it may concern:*

Be it known that I, OTTO SCHELLER, engineer, a subject of the German Emperor, residing at 126 Albrechtstrasse, Steglitz, near Berlin, Germany, have invented certain new and useful Improvements in Apparatus for Plotting Resonance Curves; and I do hereby declare the following to be a full, clear, and exact description of the invention, such as will enable others skilled in the art to which it appertains to make and use the same.

My invention relates to improvements in systems for plotting resonance curves in order to determine the damping and frequency of electric oscillations.

An apparatus and a method for determining the damping of electric oscillations have been heretofore employed, in which, by means of a resonance system which is calibrated upon periods of oscillations and by means of an instrument indicating in some form the maximum amplitude or the values of the integral of the energy oscillating in the system, resonance curves are plotted from which the damping may be calculated. On account of its simplicity such method has been used for measuring the factor of damping and for comparing periods of oscillations. Usually it was executed thus: The period of the oscillation of the comparison circuit was steadily altered by altering the capacity or the self-induction, and the intensity of the current of the energy flowing in the circuit was indicated by means of an ammeter in which was utilized the Joule-heat generated in a resistance. In such a way a resonance curve was plotted from which the sum of the dampings could be calculated consisting of the damping of the circuit by means of which the other circuit was measured and of the damping of the circuit which was to be measured.

The apparatus hitherto used permitted but very rough measurements, because the damping of the circuit by means of which the measuring took place altered with each variation of the adjustment. Besides with all arrangements of the apparatus heretofore employed the resistance of the connection or coupling not only altered or varied between the two circuits, but also between the circuit by means of which the measuring took place and the instrument indicating the intensity.

Now, the object of my invention is to provide an apparatus which in the simplest manner enables the most accurate measurements to be taken for every position within a very large range by always keeping constant the damping of the circuit by means of which the measurement is executed as well as the coupling or connection of the same with the system which is to be measured and the coupling or connection with the instrument indicating the oscillating energy.

For the purpose of explaining the invention, I have shown an example embodying the same in the accompanying drawing in which the same letters of references have been used in all the views to indicate corresponding parts.

In said drawing Figure 1 is a diagrammatical view of a system embodying the invention, Fig. 2 is a plan of a part of the condenser used in the system of Fig. 1, and Fig. 3 is a diagrammatical view of the system illustrating the relation of the circuits.

The oscillation circuit consists of a continuously variable self-induction coupled with a continuously variable condenser C. The inductance device, in the form illustrated, comprises a stationary coil $s$ and a movable coil L, so related, that by moving L with respect to $s$ the inductance may be regularly and continuously varied. It will be understood, however, that $s$ may be the movable and L the fixed member, or the two coils may be relatively movable, within the invention. The plates of the condenser are so dimensioned that—while varying—the capacity of the whole system changes to the same extent as the self-induction. Thereby the damping of the circuit remains constant. At the same time, the instrument has a very large range while it is not necessary to exchange any parts. In order to effect corresponding movements of the coil L and the adjustable plates of condenser C, to produce variations in the capacity and self-induction, the coil and the movable condenser plates are mounted on a rotatory spindle $x$, which is provided with a suitable index finger or pointer coöperating with an appropriate scale on the casing of the instrument, and said spindle is preferably extended a considerable distance above the apparatus to form a handle of insulating material to neutralize the influence which the hand of the operator might have on the delicately adjusted parts. To avoid the errors due to variations in the coupling or electrical connection between the coil L and the condenser C, the ends of the coil are positively connected to the fixed and movable members of the condenser, as shown.

The connection of the two circuits to wit, the circuit to be measured and that of a measuring instrument, is effected by means of an auxiliary circuit K, comprising an open coil S to the terminals of which is connected twisted conductors which in turn are positively and permanently connected to the terminals of coil s, hereinbefore referred to, and it will be noted that this circuit K contains in itself no damping element. The system which is to be investigated is inductively connected with the measuring circuit by inserting into the field of the former the coil S of the circuit K which influences the measuring circuit, so that the relation of this coil to the measured circuit remains constant no matter how the measuring circuit is adjusted, and, inasmuch as the electrical connections between the twisted conductor, the coil S and the coil s are positive and substantially permanent, no errors such as would be due to shifting or changing contacts occur.

In order to produce a better inductive connection between the coil s of circuit K and the coil L of the self-induction member of the instrument, and therefore to render the instrument more delicate and less liable to variation, the respective coils s and L are arranged, preferably, as shown in Fig. 1, that is to say, each of said coils includes two members, one of which lies within the other and the corresponding members of each are disposed in inductive relation so that the several parts of the coil L always occupy the same relative position with respect to the corresponding parts of coil S so that the variation in the self-induction is constant. By suitably proportioning S the reaction of s may be neglected.

It will be noted that the inductive connection between the system which is to be measured and the measuring instrument is constant and that the connection between the coil L and the condenser C is likewise constant and invariable, and in order to eliminate any other error which might occur owing to irregular connections, it is desirable that the connection between the ultimate measuring instrument, such as an electrometer for plotting the resonance curves, be likewise made permanent and invariable and not subject to constant change such as is inevitable in apparatus employing sliding contacts. As an example an arrangement is shown in which the voltage of the condenser is measured by means of an electrometer in order to plot resonance curves. This measuring is performed as follows: A part c is branched off from the capacity C, which part varies at the same ratio as the whole capacity and simultaneously therewith. Now the compensating currents in this branch are determined by means of a thermo-instrument T, or the like. The resistance W of T is preferably equal to $\sqrt{\frac{L}{C}}$ because in this case all the energy flowing in the branch is consumed.

If for some reasons the apparatus cannot be constructed in such a way that the coupling with the system to be investigated or the damping of the measuring circuit remains constant for every adjustment, the plates of c may be given such a form that the indicating instrument is always coupled with M in such a way that its deflections are such as if the conditions described above were prevalent.

A method for determining the frequency from the resonance curve is not entirely without objection as theoretically the resonance curve of the voltage and of the current do not coincide; but the differences of the said values are so small, that they cannot be measured. Of course the energy flowing in the oscillation circuit may be just as well determined by any known method. In order to determine the maximum amplitude a measuring spark-gap may be directly connected to the condenser C or it may be determined by means of a coil with spark-gap in the magnetic field of the oscillating circuit.

In case the original measuring circuit be not large enough for measuring the frequency, a larger range may be attained by changing the single coils L and s from connection in series to parallel connection, or by making additions to the measuring circuit. Preferably, these additions consist of undivided multiples of the maximum values of the self-induction and the capacity of the measuring circuit, and they must have the same damping as the latter, so that all that has been said of the damping also applies to the combination. In order to avoid a sudden alteration in the coupling of the circuit which is to be measured and in that of the coupling of the indicating instrument, an appropriate part of the said additions must be imparted to the said couplings. The oscillating circuit may also be used for transmitting certain waves by inserting a spark gap into the circuit, as described by Shoemaker (see U. S. Patent No. 717774 Jan. 6.'03).

I claim:

1. An electrical instrument of the character described, comprising a variable self-induction element including a movable coil, a variable condenser provided with movable plates, means connecting the movable coil and the movable plates to cause the adjustment of one to adjust the other accordingly, and fixed electrical connections between the self-induction element and the condenser.

2. An electrical instrument of the character described, comprising a variable self-induction element including relatively movable coils, a variable condenser including stationary and movable plates, a rotatory spindle on which the movable coil and movable condenser plates are fixed for concurrent and equal movements, and fixed electrical connections between said movable coil and the condenser plates.

3. An electrical instrument of the character described, comprising a self-induction variometer, including a stationary coil and a movable coil, a variable condenser including stationary plates and movable plates coöperating with the fixed plates, a rotatory spindle to which the movable coil and the movable plates are secured for concurrent and equal movements, and fixed electrical connections between said movable coil and the condenser plates.

In testimony whereof I have affixed my signature, in presence of two witnesses.

OTTO SCHELLER.

Witnesses:
 HENRY HASPER,
 WOLDEMAR HAUPT.